United States Patent [19]

De Vos et al.

[11] Patent Number: 5,604,265
[45] Date of Patent: Feb. 18, 1997

[54] PROCESS FOR RIGID POLYURETHANE FOAMS

[75] Inventors: Rik De Vos, Rotselaar; Anthony Cunningham, Bertem, both of Belgium

[73] Assignee: Imperial Chemical Industries PLC, London, England

[21] Appl. No.: 554,535

[22] Filed: Nov. 6, 1995

Related U.S. Application Data

[63] Continuation of Ser. No. 206,561, Mar. 3, 1994.

[30] Foreign Application Priority Data

Nov. 30, 1993 [GB] United Kingdom ............... 9324510

[51] Int. Cl.[6] .................................................. C08G 18/00
[52] U.S. Cl. ........................ 521/99; 521/114; 521/128; 521/131; 521/132
[58] Field of Search ................. 521/99, 131, 114, 521/132, 128

[56] References Cited

U.S. PATENT DOCUMENTS

| | | | |
|---|---|---|---|
| 3,486,967 | 12/1969 | Fisher | 161/160 |
| 3,556,158 | 1/1971 | Schneider | 138/156 |
| 4,505,973 | 3/1985 | Neet et al. | 428/317.9 |
| 4,795,763 | 1/1989 | Gluck et al. | 521/99 |
| 4,972,002 | 11/1990 | Volkert | 521/120 |
| 4,981,879 | 1/1991 | Snider | 521/131 |
| 5,034,424 | 7/1991 | Wenning et al. | 521/109.1 |
| 5,149,722 | 9/1992 | Soukup | 521/99 |
| 5,192,607 | 3/1993 | Soukup | 428/314.4 |
| 5,238,970 | 8/1993 | De Vos et al. | 521/132 |
| 5,240,965 | 8/1993 | De Vos et al. | 521/132 |
| 5,286,759 | 2/1994 | Smits et al. | 521/131 |

FOREIGN PATENT DOCUMENTS

| | | |
|---|---|---|
| 57/147510 | 9/1982 | Japan . |
| 89/134603 | 1/1991 | Japan . |
| 89/134604 | 1/1991 | Japan . |
| 89/134605 | 1/1991 | Japan . |
| 89/134602 | 1/1991 | Japan . |
| 03121143 | 5/1991 | Japan . |

OTHER PUBLICATIONS

"A Structural Model of Heat Transfer Through Rigid Polyurethane Foam", Sep. 1986, pp. 32–49.

*Primary Examiner*—Morton Foelak

[57] ABSTRACT

A process for the preparation of a fine celled, closed celled rigid polyurethane or urethane-modified polyisocyanate foam is disclosed which comprises reacting a polyfunctional isocyanate-reactive composition with a polyisocyanate composition, characterized in that the foam-forming composition comprises carbon black.

8 Claims, No Drawings

PROCESS FOR RIGID POLYURETHANE FOAMS

CROSS REFERENCE TO RELATED APPLICATIONS

The present application is a continuation of pending U.S. patent application Ser. No. 08/206,561 filed Mar. 3, 1994 entitled "Process for Rigid Polyurethane Foams".

DESCRIPTION

This invention relates to processes for the preparation of closed celled rigid polyurethane or urethane-modified polyisocyanurate foams, to foams prepared thereby, and to novel compositions useful in said process.

Closed celled rigid polyurethane and urethane-modified polyisocyanurate foams are in general prepared by reacting the appropriate polyisocyanate and polyol in the presence of a blowing agent. One use of such foams is as a thermal insulation medium as for example in the construction of refrigerated storage devices. The thermal insulating properties of closed celled rigid foams are dependent upon a number of factors including the cell size and the thermal conductivity of the contents of the cells.

A class of materials which has been widely used as blowing agent in the production of rigid polyurethane and urethane-modified polyisocyanurate foams is the fully halogenated chlorofluorocarbons, and in particular trichlorofluoromethane (CFC-11). The exceptionally low thermal conductivity of these blowing agents, and in particular of CFC-11, has enabled the preparation of rigid foams having very effective insulation properties. Recent concern over the potential of chlorofluorocarbons to cause depletion of ozone in the atmosphere has led to an urgent need to develop reaction systems in which chlorofluorocarbon blowing agents are replaced by alternative blowing materials which are environmentally acceptable and which also produce foams having the necessary properties for the many applications in which they are used.

Such alternative blowing agents proposed in the prior art include hydrochlorofluorocarbons, hydrofluorocarbons and (cyclo)alkanes. Although these materials are environmentally more acceptable than chlorofluorocarbons they are inferior in thermal insulation.

In order to improve the thermal insulation of closed celled rigid polyurethane and urethane-modified polyisocyanurate foams blown with such alternative blowing agents a variety of techniques have been proposed, most of them concentrated on decreasing the thermal radiation component of the thermal conductivity of the rigid foam.

One of these techniques consists of adding carbon black to the foam formulation. The use of carbon black to improve the thermal insulation of closed celled rigid polyurethane foam is described in U.S. Pat. Nos. 4,795,763, 5,149,722 and 5,192,607 and Japanese patent publication Kokai No. 57/147510.

The thermal conductivity reductions reported in these publications for closed celled rigid polyurethane foams incorporating carbon black levels below 5% by weight based on the total foam formulation are less than 8%.

Another way of decreasing the thermal radiation component consists of decreasing the foam cell sizes. Thus European patent publication No. 0 508 649, U.S. Pat. Nos. 4,981,879, 5,034,424 and 4,972,002 and Japanese patent publications Kokai Nos. 91/743, 91/744, 91/745 and 91/746 describe the use of a substantially fluorinated or perfluorinated hydrocarbon additive as (co)-blowing agent or nucleating agent in closed celled rigid polyurethane foam in order to reduce the foam cell size. However in view of the worse insulating properties of these additives when used as (co)-blowing agent an improvement in thermal insulation of the foam is hardly obtained for closed celled rigid foam.

Therefore it is an object of the present invention to provide closed celled rigid polyurethane or urethane-modified polyisocyanurate foams which have, even when blown with alternative environmentally acceptable blowing agents, the same or improved thermal insulation properties than closed celled rigid polyurethane or urethane-modified polyisocyanurate foams blown with chlorofluorocarbons.

It is another object of the present invention to provide fine celled closed celled polyurethane or urethane-modified polyisocyanurate foams having improved thermal insulation properties than the known fine celled closed celled rigid polyurethane or urethane-modified polyisocyanurate foams.

It is still another object of the present invention to provide carbon black filled closed celled rigid polyurethane or urethane modified polyisocyanurate foams showing substantial thermal conductivity reductions.

The present invention provides a process for the preparation of a fine celled closed celled rigid polyurethane or urethane-modified polyisocyanurate foam by reaction of a polyfunctional isocyanate-reactive composition with a polyisocyanate composition characterised in that the foam-forming composition comprises carbon black.

By fine celled closed celled rigid polyurethane or urethane-modified polyisocyanurate foam as used herein is meant closed celled rigid polyurethane or urethane-modified polyisocyanurate foam having cells of average diameter less than 150 micron, preferably less than 120 micron and more preferably less than 100 micron.

The cell size as used herein represents the isotropic diameter of the cell obtainable according to the method described by A. Cunningham in "Proceedings of Conference on Heat in Mass Transfer in Cryoengineering and Refrigeration", September 1986, page 32–49.

By the process of the present invention fine celled closed celled carbon black filled rigid polyurethane or urethane-modified polyisocyanurate foams are obtained having substantially improved thermal insulation properties compared to the known fine celled closed celled unfilled rigid polyurethane or urethane-modified polyisocyanurate foams of the prior art.

Some prior art descriptions of fine celled closed celled rigid polyurethane or urethane-modified polyisocyanurate foams mention the possible addition of fillers without however further exemplifying the particular type of filler to be used (for example U.S. Pat. No. 4,981,879). Others (e.g. U.S. Pat. No. 4,972,002) give a list of fillers, not including carbon black, to be used particularly as reinforcing filler and not to reduce the thermal conductivity of the foam.

Further the relative improvement in thermal insulation obtained by the incorporation of carbon black in fine celled closed celled rigid polyurethane or urethane-modified polyisocyanurate foams is substantially higher than the relative improvement obtained by the incorporation of the same amount of carbon black (based on the total foam-forming composition) in closed celled rigid polyurethane or urethane-modified polyisocyanurate foams of normal cell size as described in the prior art publications mentioned above. These prior art references do not mention the incorporation of carbon black in fine celled foam or suggest the substantial effect it may have in fine celled foams compared to foams of normal cell size.

The carbon black may be any of the different kinds available, such as lampblack, channel black, gas furnace black, oil furnace black, thermal black and graphitic carbon black. The particle size of the carbon black particles to be employed may vary, but generally the carbon black has a mean particle diameter of from about 0.01 to 20 micron, preferably from 0.02 to 3 micron and more preferably from 0.02 to 0.2 micron and even more preferably from 0.1 to 0.2 micron.

Preferred carbon blacks for use in the present process include furnace black SB250, furnace black SB550 and channel black SB4 (all available from Degussa). Especially SB4 is preferred.

Typically the amount of the carbon black used in the process of the present invention ranges from 0.1 to 5%, preferably from 1 to 3% and is most preferably about 2% by weight based on the total foam-forming composition.

A uniform carbon black dispersion in the finished foam product is essential for the significant improvement of insulation value in accordance with the present invention. To produce the requisite homogeneously filled foam, the carbon black is first uniformly distributed in at least one of the foam-forming ingredients such as the polyisocyanate composition or the isocyanate-reactive composition by any conventional dispersing means. There may be added compounds which help to disperse carbon black in the foam-forming ingredients such as described in U.S. Pat. No. 5,149,722. Further the carbon black may be surface treated in order to improve the dispersing of the carbon black in the foam-forming ingredients.

In order to obtain fine celled rigid foam an inert, insoluble fluorinated compound is incorporated into the foam-forming mixture for use in the present process.

The term inert as used herein with reference to the inert, insoluble fluorinated compound used in the process of the invention is to be understood as indicating a substantial lack of chemical reactivity with any of the other components used in the foam-forming reaction.

The term insoluble as used herein with reference to the inert, insoluble fluorinated compound used in the process of the present invention is defined as showing a solubility in either the isocyanate-reactive composition or the polyisocyanate composition with which it is to be blended of less than 500 ppm by weight at 25° C. and atmospheric pressure.

Inert, insoluble fluorinated compounds for use in the process of the invention include any of those disclosed in U.S. Pat. Nos. 4,981,879, 5,034,424, 4,972,002 and European Patent Application No. 0508649.

It is preferred, however, to use an inert, insoluble, substantially fluorinated or perfluorinated compound having a boiling point of at least 20° C. at atmospheric pressure, and preferably at least 40° C. and more preferably at least 60° C., or 80° C. or 100° C.

The term substantially fluorinated as used herein with reference to the inert, insoluble, substantially fluorinated compound used in the process of the invention is to be understood to embrace compounds in which at least 50% of the hydrogen atoms of the unfluorinated compounds are replaced by fluorine.

Suitable compounds include substantially fluorinated or perfluorinated hydrocarbons, substantially fluorinated or perfluorinated ethers, substantially fluorinated or perfluorinated tertiary amines, substantially fluorinated or perfluorinated amino-ethers and substantially fluorinated or perfluorinated sulphones.

Suitable examples of substantially fluorinated or perfluorinated hydrocarbons are those containing from 1 to 15 carbon atoms, which my be either cyclic or acyclic, either aromatic or aliphatic and either saturated or unsaturated, such as substantially fluorinated and perfluorinated methane, ethane, propane, butane, pentane, hexane, heptane, octane, nonane, decane, cyclobutane, cyclooctane, cyclohexane, cyclopentane, norbornadiene, decaline, dimethylcyclobu-tane, methylcyclohexane, 1-methyldecaline, phenanthrene, dimethylcyclobutane, and isomers thereof. Particular mention may be made of perfluoro-n-pentane and perfluoro-n-hexane.

Suitable examples of substantially fluorinated or perfluorinated ethers are those containing from 3 to 15 carbon atoms, which may be cyclic or acyclic, such as substantially fluorinated or perfluorinated dialkyl ethers and alkyl substituted cyclic ethers. Particular mention may be made of perfluorinated methyl ethyl ether, perfluorinated methyl propyl ether, the perfluorinated alkyltetrahydropyrans such as perfluorinated propyltetrahydropyran, and the perfluorinated alkyltetrahydrofurans such as perfluorinated propyltetrahydrofuran and perfluorinated butyltetrahydrofuran. Additional examples of substantially fluorinated or perfluorinated ethers which are suitable for use in the process of the invention are the commercially available fluorinated polyethers such as Galden HT 100, HT 200, HT 230, HT250 and HT 270 from Montefluos SpA (Galden is a Trade Mark).

Suitable examples of substantially fluorinated or perfluorinated amines are tertiary amines containing from 3 to 15 carbon atoms, which may be cyclic or acyclic, such as substantially fluorinated or perfluorinated trialkylamines, N-alkylated cyclic amines, tetraalkylhydrazines and trialkylhydroxylamines. Particular mention may be made of substantially fluorinated or perfluorinated trimethylamine, triethylamine, ethyldimethylamine, methyldiethylamine, tripropylamine, tributylamine, tripentylamine, tetramethylhydrazine, trimethylhydroxylamine, O-ethyl dimethylhydroxylamine, O,O'-bis-(dialkylamino)propylene-glycol, O,O'-bis-(dialkylamino)ethyleneglycol, N-methylpyrrolidine and the N-alkylpiperidines such as N-methylpiperidine.

Suitable examples of substantially fluorinated or perfluorinated aminoethers include those having from 3 to 15 carbon atoms, which may be cyclic or acyclic, such as substantially fluorinated or perfluorinated trialkylethanolamines and N-alkylmorpholines. Particular mention may be made of substantially fluorinated or perfluorinated trimethylethanolamines and N-($C_{1-6}$ alkyl)morpholines such as N-methyl, N-ethyl and N-isopropylmorpholine.

Suitable examples of substantially fluorinated or perfluorinated sulphones include perfluorinated dialkylsulphones having from 2 to 8 carbon atoms such as perfluoro-(dimethylsulphone) and perfluoro-(methyldiethyl-sulphone).

Certain inert, insoluble fluorinated compounds suitable for use in the process of the invention may themselves act as blowing agents under the conditions pertaining to the foam-forming reaction, particularly where their boiling point is lower than the exothermtemperature achieved by the reaction mixture. For the avoidance of doubt, such materials may, partly or completely, fulfil the function of blowing agent in addition to that of inert, insoluble fluorinated compound.

The amount of the inert, insoluble fluorinated compound used in the process of the present invention ranges from 0.05 to 10%, preferably from 0.1 to 3%, most preferably from 0.1 to 2% by weight based on the total foam-forming composition.

Suitable organic polyisocyanates for use in the process include any of those known in the art for the preparation of rigid polyurethane or urethane-modified polyisocyanurate foams, and in particular the aromatic polyisocyanates such as diphenylmethane diisocyanate in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, toluene diisocyanate in the form of its 2,4- and 2,6-isomers and mixtures thereof, 1,5-naphthalene diisocyanate and 1,4-diisocyanatobenzene. Other organic polyisocyanates which may be mentioned include the aliphatic diisocyanates such as isophorone diisocyanate, 1,6-diisocyanatohexane and 4,4'-diisocyanatodicyclohexylmethane.

Polyfunctional isocyanate-reactive compositions for use in the process include any of those known in the art for the preparation of rigid polyurethane or urethane-modified polyisocyanurate foams. Of particular importance for the preparation of rigid foams are polyols and polyol mixtures having average hydroxyl numbers of from 300 to 1000, especially from 300 to 700 mg KOH/g, and hydroxyl functionalities of from 2 to 8, especially from 3 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolylene diamine, diaminodiphenylmethane and polymethylene polyphenylene polyamines; and aminoalcohols, for example ethanolamine and diethanolamine; and mixtures of such initiators. Other suitable polymeric polyols include polyesters obtained by the condensation of appropriate proportions of glycols and higher functionality polyols with dicarboxylic or polycarboxylic acids. Still further suitable polymeric polyols include hydroxyl terminated polythioethers, polyamides, polyesteramides, polycarbonates, polyacetals, polyolefins and polysiloxanes. The quantities of the polyisocyanate compositions and the polyfunctional isocyanate-reactive compositions to be reacted will depend upon the nature of the rigid polyurethane or urethane-modified polyisocyanurate foam to be produced and will be readily determined by those skilled in the art.

The process is carried out in the presence of any of the blowing agents known in the art for the preparation of rigid polyurethane or urethane-modified polyisocyanurate foams. Such blowing agents include water or other carbon dioxide-evolving compounds, or inert low boiling compounds having a boiling point of above $-70°$ C. at atmospheric pressure.

Where water is used as blowing agent, the amount may be selected in known manner to provide foams of the desired density, typical amounts being in the range from 0.05 to 5% by weight based on the total reaction system.

Suitable inert blowing agents include those well known and described in the art, for example hydrocarbons, dialkyl ethers, alkyl alkanoates, aliphatic and cycloaliphatic hydrofluorocarbons, hydrochlorofluorocarbons, chlorofluorocarbons, hydrochlorocarbons and fluorine-containing ethers.

Suitable hydrocarbon blowing agents include lower aliphatic or cyclic hydrocarbons such as pentane, iso-pentane, cyclopentane, neopentane, hexane, and cyclohexane.

Suitable dialkyl ethers to be used as blowing agents include compounds having from 2 to 6 carbon atoms. As examples of suitable ethers there may be mentioned dimethyl ether, methyl ethyl ether, diethyl ether, methyl propyl ether, methyl isopropyl ether, ethyl propyl ether, ethyl isopropyl ether, dipropyl ether, propyl isopropyl ether, diisopropyl ether, methyl butyl ether, methyl isobutyl ether, methyl t-butyl ether, ethyl butyl ether, ethyl isobutyl ether, and ethyl t-butyl ether.

Suitable alkyl alkanoates which may be used as blowing agents include methyl formate, methyl acetate, ethyl formate and ethyl acetate.

Suitable hydrofluorocarbons which may be used as blowing agents include lower hydrofluoroalkanes, for example difluoromethane, 1,2-difluoroethane, 1,1,1,4,4,4-hexafluorobutane, pentafluoroethane, 1,1,1,2-tetrafluoroethane and 1,1,2,2-tetrafluoroethane.

Suitable hydrochlorofluorocarbons which may be used as blowing agents include chlorodifluoromethane, 1,1-dichloro-2,2,2-trifluoroethane, 1,1-dichloro-1-fluoroethane, 1-chloro-1,1-difluoroethane, 1-chloro-2-fluoroethane, and 1,1,1,2-tetrafluoro-2-chloroethane.

Suitable chlorofluorocarbons which may be used as blowing agents include trichlorofluoromethane, dichlorodifluoromethane, trichlorotrifluoroethane and tetrafluorodichloroethane.

Suitable hydrochlorocarbons which may be used as blowing agents include 1- and 2-chloropropane.

Suitable fluorine-containing ethers which may be used as blowing agents include bis-(trifluoromethyl)ether, trifluoromethyl difluoromethyl ether, methyl fluoromethyl ether, methyl trifluoromethyl ether, bis-(difluoromethyl)ether, fluoromethyl difluoromethyl ether, methyl difluoromethyl ether, bis-(fluoromethyl)ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2,2-trifluoroethyl difluoromethyl ether, 1,1-difluoroethyl methyl ether, 1,1,1,3,3,3-hexafluoroprop-2-yl fluoromethyl ether.

Preferred blowing agents for use in the process are those having boiling points between $-70°$ C. and $+80°$ C. at atmospheric pressure.

In view of the improved thermal insulation properties associated with foams prepared by the process of the invention, the use of fully halogenated chlorofluorocarbon blowing agents may advantageously be avoided.

Examples of preferred blowing agents include pentane, isopentane, cyclopentane, 1,1-dichloro-1-fluoroethane (HCFC 141b) and 1,1,1,2-tetrafluoroethane (HFC 134a).

The total quantity of blowing agent to be used in a reaction system for producing cellular polymeric materials will be readily determined by those skilled in the art, but will typically be from 2 to 25% by weight based on the total reaction system.

In addition to the polyisocyanate and polyfunctional isocyanate-reactive compositions, the carbon black, the inert, insoluble fluorinated compound and the blowing agent, the foam-forming reaction mixture will commonly contain one or more other auxiliaries or additives conventional to formulations for the production of rigid polyurethane and urethane-modified polyisocyanurate foams. Such optional additives include crosslinking agents, for examples low molecular weight polyols such as triethanolamine, foam-stabilising agents or surfactants, for example siloxane-oxyalkylene copolymers, urethane catalysts, for example tin compounds such as stannous octoate or dibutyltin dilaurate or tertiary amines such as dimethylcyclohexylamine or triethylene diamine, and fire retardants, for example halogenated alkyl phosphates such as tris chloropropyl phosphate or alkyl phosphonates.

In order to stabilise the inert, insoluble fluorinated compound in one of the foam-forming ingredients it is preferred to employ a surfactant in order to obtain an emulsion of this inert, insoluble fluorinated compound in the polyisocyanate or polyol composition.

Most preferred surfactants are fluorinated surfactants. Examples of such surfactants are fluorinated alkylpolyoxyethylene ethanols, alkylalkoxylates and alkylesters. Examples of useful fluorinated surfactants which are commercially available are Fluorad FC 430 and FC 431 from 3M, Forafac 1110D, 1157, 1157N and 1199D from Atochem and Fluowet S 3690, OTN and CD from Hoechst.

The amount of surfactant used is between 0.02 and 5 pbw per 100 pbw of foam forming reaction system and between 0.05 and 10 pbw per 100 pbw of polyisocyanate or polyol composition.

The foam-forming reaction mixture can also contain in addition to carbon black or instead of carbon black other infrared absorbing materials in order to reduce the thermal conductivity of the fine celled closed celled rigid foam. Examples of such other infrared absorbing materials include $TiO_2$, iron oxides such as $Fe_2O_3$, and $Fe_3O_4$, $Cr_xFe_{2-x}$ (x=0.3 to 2), mica, talc, copper, $Al_2O_3$, $Cr_2O_3$, $Mn_2O_3$, $MnO_2$, $ZrO_2$, $FeTiO_3$, $MgAl_2O_4$, $CoAl_2O_4$, hydrated oxides such as FeO(OH), aluminum silicate, metal carbides, metal silicides, metal nitrides, metal borides (especially Nickel and its alloys), metal cyanides such as Berlin Blue, metal fibres/flakes such as Al, Mn, Fe, Ni, Pd, Pt, Ag, Au fibres and organic dyestuffs such as ultramarine and (metal) phthalocyanine, Ni bis(dithiolene) complexes, polymethine dyes, heterocyclic cyanine dyes, croconium dyes and minerals of the kaolinite-halloysite series.

In operating the process for making rigid foams according to the invention, the known one-shot, prepolymer or semi-prepolymer techniques may be used together with conventional mixing methods and the rigid foam may be produced in the form of slabstock, mouldings, cavity fillings, sprayed foam, frothed foam or laminates with other materials such as hardboard, plasterboard, plastics, paper or metal.

To reduce the number of component streams delivered to the final mixing apparatus, most of the additives such as the blowing agent, catalyst, fluorinated compound and carbon black and optionally others may be premixed with one of the major components of the foam formulation, in general with the isocyanate-reactive component.

Therefore the present invention also provides an isocyanate-reactive composition comprising an inert, insoluble fluorinated compound and further comprising carbon black dispersed therein.

The invention is illustrated but not limited by the following examples.

EXAMPLE 1

Preparation of carbon black dispersions 21.6 g Solsperse 20K dispersant (available from Imperial Chemical Industries PLC) dried using rotary vacuum and 60 g toluene dried over a molecular sieve were added to a rotary vacuum flask and mixed at room temperature. 15 g SB4 carbon black (available from Degussa) dried overnight in an oven at 120° C. was then added and dispersed using low shear mixing prior to placing in an ultrasonic bath for 30 minutes. A further 15 g of SB4 was then added to the flask and the ultrasonic treatment repeated for 1 hour. 62.5 g of polyol Daltolac XR144 (available from Imperial Chemical Industries) was added to the obtained dispersion and left to rotate on the rotavac at room temperature for 15 minutes. The solvent was then removed under vacuum at oil bath temperatures of 140° C.

The obtained carbon black dispersion (referred to hereinafter as CB 1) contained 55% by weight of polyol, 26% by weight of carbon black and 19% by weight of dispersant.

Another carbon black dispersion (referred to hereinafter as CB 2) was prepared along the same lines. This dispersion contained 48% by weight of polyol, 14% by weight of carbon black, 12% by weight of dispersant and additionally 26% by weight of titaniumdioxide (RXL available from Tioxide).

Carbon black CB 3 referred to hereinafter represents Sigrafill carbon black.

EXAMPLE 2

CFC 11 blown foams

Rigid polyurethane foams were prepared from the ingredients as indicated in table 1 below (amounts are given in pbw).

As polyols were used Daltolac XR 159 and Daltolac XR 144, both available from Imperial Chemical Industries. As polyisocyanate was used Suprasec DNR available from Imperial Chemical Industries. As surfactants were used B8404 available from Goldschmidt and FC 430, a fluoro-surfactant available from 3M. As catalysts were used Niax A1, Catalyst SFB and Catalyst SFC, all available from Imperial Chemical Industries. As fluorinated compound was used FC-87 (perfluoropentane) available from 3M.

Results on foam density (in kg/m³), cell size (in micron) and thermal conductivity (initial lambda value in mW/m K) are also given in table 1.

TABLE 1

| Foam | 1 | 2 | 3 | 4 | 5 | 6 | 7 | 8 | 9 |
|---|---|---|---|---|---|---|---|---|---|
| XR 159 | 50.0 | 50.0 | 50.0 | 50.0 | 50.0 | 50.0 | 50.0 | 50.0 | 50.0 |
| XR 144 | 50.0 | 50.0 | 32.1 | 39.5 | 19.4 | 30.8 | 38.9 | 17.8 | 50.0 |
| B8404 | 1.5 | 1.5 | 1.5 | 1.5 | 1.5 | 1.5 | 1.5 | 1.5 | 1.5 |
| Niax A1 | 0.1 | 0.1 | 0.1 | 0.1 | 0.1 | 0.1 | 0.1 | 0.1 | 0.1 |
| SFB | 2.4 | 2.4 | 2.4 | 2.4 | 2.4 | 2.4 | 2.4 | 2.4 | 2.4 |
| SFC | 0.5 | 0.5 | 0.5 | 0.5 | 0.5 | 0.5 | 0.5 | 0.5 | 0.5 |
| FC 430 | — | 4.0 | — | — | — | 4.0 | 4.0 | 4.0 | 4.0 |
| Water | 3.3 | 3.3 | 3.3 | 3.3 | 3.3 | 3.3 | 3.3 | 3.3 | 3.3 |
| FC 87 | — | 26.9 | — | — | — | 26.9 | 26.9 | 26.9 | 26.9 |
| CFC 11 | 25.3 | 12.6 | 25.3 | 25.3 | 25.3 | 12.6 | 12.6 | 12.6 | 12.6 |
| CB 1 | — | — | 32.6 | — | — | 35.1 | — | — | — |
| CB 2 | — | — | — | 22.0 | 64.3 | — | 23.4 | 68.4 | — |
| CB 3 | — | — | — | — | — | — | — | — | 9.2 |
| DNR | 157 | 157 | 157 | 157 | 157 | 157 | 157 | 157 | 157 |
| Density | 22.7 | 25.9 | 25.0 | 24.0 | 25.9 | 28.6 | 27.9 | 29.9 | 25.3 |
| Cell size | 406 | 161 | 426 | 459 | 474 | 144 | 148 | 143 | 155 |
| Lambda | 18.0 | 19.2 | 18.2 | 18.7 | 21.9 | 16.0 | 18.1 | 17.9 | 18.6 |

These results show that by using carbon black in fine celled closed celled rigid polyurethane foam at loadings between 1 and 3% by weight based on the total foam forming composition substantial reductions in thermal conductivity are obtained (foams nos 6, 7 and 8). In contrast herewith addition of the same amounts of carbon black to closed celled rigid polyurethane foam of normal cell size (foams nos 3, 4 and 5) doesn't reduce the thermal conductivity at all.

EXAMPLE 2

HCFC 141b and/or water blown foams

Rigid polyurethane foams were prepared from the ingredients as indicated in table 2 below (amounts are given in pbw).

As polyols were used Daltolac XR 159 and Daltolac XR 144, both available from Imperial Chemical Industries. As polyisocyanate was used a prepolymer derived from Suprasec DNR (available from Imperial Chemical Industries) and 2% by weight of diethylene glycol (referred to herein as Prepolymer 1). As surfactants were used B8404 available from Goldschmidt and SCS 1294 available from Imperial Chemical Industries. As catalysts were used Niax A1, Catalyst SFB and Catalyst SFC, all available from Imperial Chemical Industries. As fluorinated compound was used perfluorobutyltetrahydrofuran (referred to herein as PFBTHF) available from Fluorochem Ltd.

Results on foam density (in kg/m³), cell size (in micron) and thermal conductivity (initial lambda value in mW/m K) are also given in table 2.

TABLE 2

| Foam | 10 | 11 | 12 | 13 |
|---|---|---|---|---|
| XR 159 | 50.0 | 50.0 | 50.0 | 50.0 |
| XR 144 | 50.0 | 30.8 | 50.0 | 28.4 |
| B8404 | 1.5 | 1.5 | 1.5 | 1.5 |
| Niax A1 | 0.1 | 0.1 | 0.1 | 0.1 |
| SFB | 2.4 | 2.4 | 2.4 | 2.4 |
| SFC | 0.5 | 0.5 | 0.5 | 0.5 |
| SCS 1294 | 2.0 | 2.0 | 2.0 | 2.0 |
| Water | 3.3 | 3.3 | 6.6 | 6.6 |
| PFBTHF | 7.6 | 7.6 | 7.6 | 7.6 |
| HCFC 141b | 21.5 | 21.5 | — | — |
| CB 1 | — | 35.0 | — | 39.4 |
| Prepolymer 1 | 168 | 168 | 224.5 | 224.5 |
| Density | 24.5 | 26.1 | 25.4 | 27.5 |
| Cell size | 139 | 127 | 230 | 220 |
| Lambda | 18.9 | 18.2 | 22.2 | 21.3 |

We claim:

1. Process for the preparation of a fine celled closed celled rigid polyurethane or urethane-modified polyisocyanurate foam, wherein the cells of said foam have an average diameter of less than 150 micron, comprising the step of reacting a polyfunctional isocyanate-reactive composition with a polyisocyanate composition to provide a foam-forming composition, characterized in that the foam-forming composition comprises carbon black and wherein an inert, insoluble substantially, fluorinated compound having at least 50% of the hydrogen atoms of the unfluorinated compound replaced by fluorine is incorporated into the foam-forming composition.

2. Process according to claim 1 wherein the carbon black has a mean particle diameter of from 0.02 to 3 micron.

3. Process according to claim 1 wherein the amount of carbon black ranges from 0.1 to 5% by weight based on the total foam-forming composition.

4. Process according to claim 1 wherein the carbon black is surface treated.

5. Process according to claim 1 wherein the inert, insoluble fluorinated compound is selected from the group consisting of substantially fluorinated or perfluorinated hydrocarbons, substantially fluorinated or perfluorinated ethers, substantially fluorinated or perfluorinated amines and substantially fluorinated or perfluorinated amino-ethers.

6. Process according to claim 5 wherein the inert, insoluble fluorinated compound is perfluoro-n-pentane or perfluorinated alkyltetrahydrofuran.

7. Process according to claim 6 wherein the amount of the inert, insoluble fluorinated compound ranges from 0.05 to 10% by weight based on the total foam-forming composition.

8. Fine celled closed celled rigid polyurethane or urethane-modified polyisocyanurate foam prepared according to the process defined in claim 1.

* * * * *